Dec. 4, 1923.
R. F. HALL
ANTISKID SHOE
Filed May 4, 1923
1,476,606
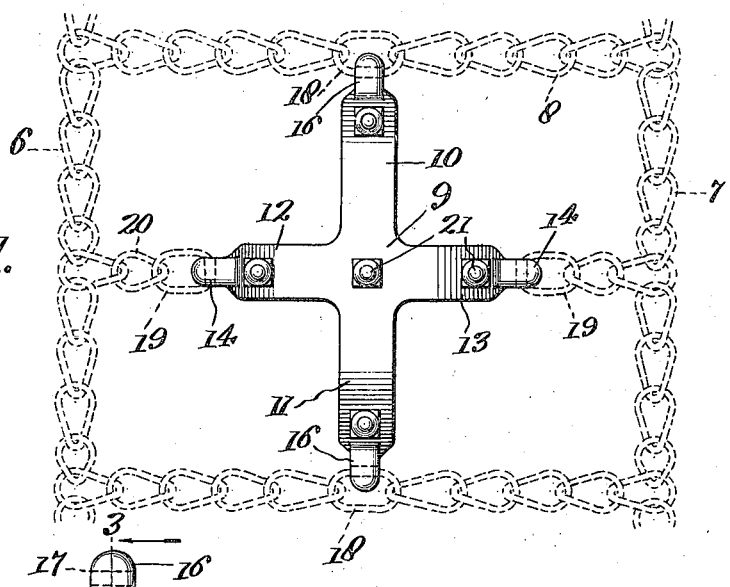
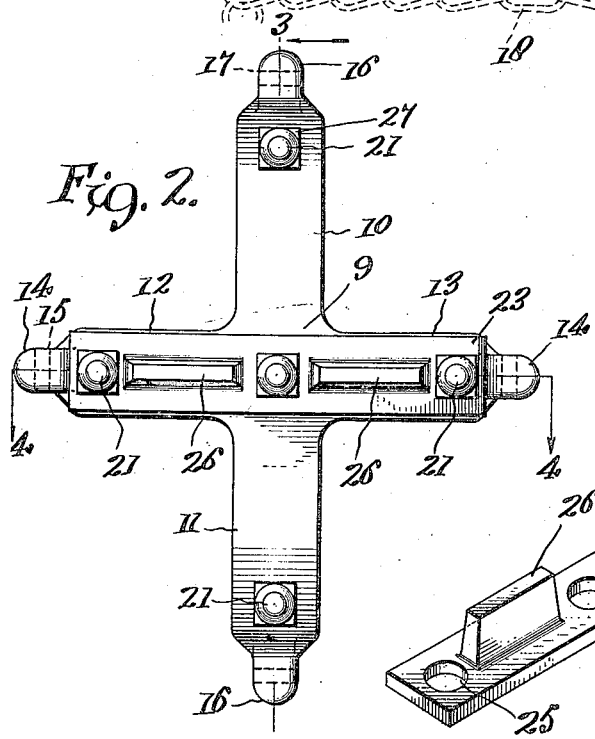
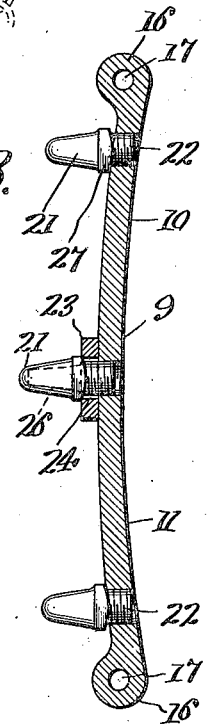
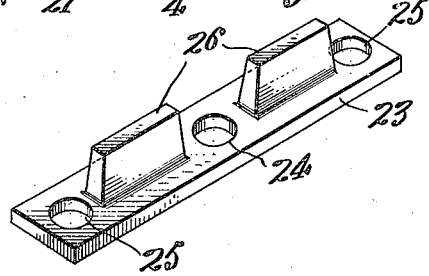
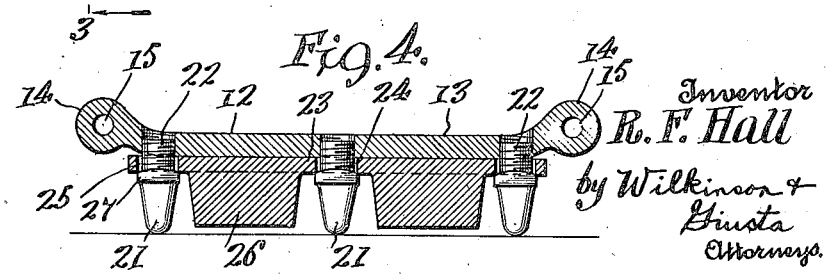
Inventor
R. F. Hall
by Wilkinson & Giusta
Attorneys.

Patented Dec. 4, 1923.

1,476,606

UNITED STATES PATENT OFFICE.

RALPH F. HALL, OF LEAD, SOUTH DAKOTA.

ANTISKID SHOE.

Application filed May 4, 1923. Serial No. 636,607.

*To all whom it may concern:*

Be it known that I, RALPH F. HALL, a citizen of the United States, residing at Lead, in the county of Lawrence and State of South Dakota, have invented certain new and useful Improvements in Antiskid Shoes; and I do hereby declare the following to be a full, clear, and exact description of the invention, such as will enable others skilled in the art to which it appertains to make and use the same.

The present invention relates to improvements in anti-skid shoes and has for an object to provide an improved device of this nature for use in connection with tire chains.

It is another object of the invention to provide a compact anti-skid shoe cooperating and forming a part of a tire chain, the shoe being adapted to hold calks in suitable number and is further so constructed and arranged as to receive a traction device useful in mud or soft ground.

With the foregoing and other objects in view, the invention will be more fully described hereinafter, and will be more particularly pointed out in the claim appended hereto.

In the drawings, wherein like symbols refer to like or corresponding parts throughout the several views:

Figure 1 is a fragmentary plan view of a tire chain having the improved shoe coupled thereto.

Figure 2 is a plan view of the improved device with the mud hook or traction device applied thereon.

Figure 3 is a longitudinal section taken through the device.

Figure 4 is a cross section taken on the line 4—4 in Figure 2, and

Figure 5 is a perspective view of the mud hook or traction device.

Referring more particularly to the drawings 6 and 7 designates the side chains and 8 the connecting cross chains which are constructed after the manner of Weed or other anti-skid chains used on automobile passenger and truck tires to avoid slipping and side skidding.

In accordance with the invention I employ a heavy shoe 9 of cast, wrought or forged metal or other appropriate material, the shoe being made in the form of a cross and having arms 10 and 11 extending in alignment and in the same direction with the circumference of the tire about which the device is to be placed it being understood that the arms 10 and 11 are given a curvature to conform to that substantially possessed by the tire for which the device is designed. These tire chains are made in various sizes to fit the varying diameters of tires and the curvature shown in Figure 3 will be altered to accord with the length of the chain.

The cross arms 12 and 13 extend also in alignment and transversely of the tire, these arms being preferably shorter than the circumferential arms 10 and 11. The cross arms may also conform to the transverse curvature of the tire but in Figure 4 the cross arms are shown substantially flat to agree with the external shape of flat truck tires. The cross arms at their free ends are provided with enlargements 14 in which eyes 15 are made and in a similar way enlargements 16 are made at the outer ends of the circumferential arms, being provided with eyes 17. These various eyes of the four arms are adapted to be coupled to chain links and the cross chains 8 will be found suitable for this purpose, they preferably having a straight intermediate link 18, whereas the other links may be tapered.

The transverse arms are coupled to similar straight links 19 forming portions of short chains 20 which extend from the side chains 6 and 7 at portions thereof intermediate the connections made with the cross chains 8. The outer end portions of the various arms of the device and also the central portion of the shoe are provided with calks 21 of a suitable length adapted to extend beyond the chain and the shoe to take a firm grip upon the road surface or ground, and these calks are provided with threaded shanks 22 to enable them to be removably secured in the threaded perforations made in the arms and shoe. Between the shanks and the operative end of the calks are shoulders 27 to hold the traction device in place. The calks may thus be removed when broken and replaced from time to time as wear takes place.

Of course any other arrangement of the calks may be made and more or less calks may be supplied but it is preferable to have the central calk and the calk in the cross arms 12 and 13 disposed in alinement for the purpose of being of further use in attaching the mud hook or traction device shown in Figure 5.

In this Figure 5 is the device referred to comprising an elongated flat bar 23 having a central perforation 24 and end perforations 25. The bar is further provided with projecting lugs or webs 26, in the instance, being two in number and lying between the intermediate and the end perforations respectively. These lugs or webs are of sufficient surface area to take substantially deeply in the soft ground or mud in order to secure the necessary traction for enabling the vehicle to pull out of mud under its own power. The perforations in the bar 23 are situated to correspond to the positions of the calks in the cross arms 12 and 13 and in the central part of the shoe in order that when the calks are unscrewed, the bar 23 may be put in place and afterwards the calks may be passed through the openings 24 and 25 and again threaded into the threaded perforations in the arms. The manner of attaching the traction device is shown in Figures 2 and 4. The calks thus subserve a twofold function and the calks lie in the space between and at the ends of the lugs 26 and they thus contribute to the traction secured by the device.

It will be appreciated from the foregoing that the device is extremely simple and compact and will be inexpensive to make, although easy to install in conjunction with anti-skid and vehicle chains.

It is obvious that various changes and modifications may be made in the details of construction and design of the above specifically described embodiment of this invention without departing from the spirit thereof, such changes and modifications being restricted only by the scope of the following claim.

What is claimed is:—

A device as described comprising a metallic body having circumferential and transverse arms provided with eyes at their ends and threaded perforations, calks having threaded shanks screwed into said perforations, and a traction device comprising a bar having perforations to receive the shanks of certain of the calks and having lugs extending outwardly to catch into the ground or mud, said calks having shoulders to engage the portions of the bar about the perforations whereby to hold the traction device in place.

RALPH F. HALL.